United States Patent
Jhang et al.

(10) Patent No.: US 9,567,004 B1
(45) Date of Patent: Feb. 14, 2017

(54) METHOD AND APPARATUS FOR VEHICLE PATH TRACKING WITH ERROR CORRECTION

(71) Applicant: AUTOMOTIVE RESEARCH & TESTING CENTER, Lugang Chen, Changhua Hsien (TW)

(72) Inventors: Tong-Kai Jhang, Changhua Hsien (TW); Jin-Yan Hsu, Changhua Hsien (TW); Jiun-Jie Chen, Changhua Hsien (TW)

(73) Assignee: AUTOMOTIVE RESEARCH & TESTING CENTER, Lugang Chen, Changhua Hsien (TW)

( * ) Notice: Subject to any disclaimer, the term of this patent is extended or adjusted under 35 U.S.C. 154(b) by 0 days.

(21) Appl. No.: 14/982,504

(22) Filed: Dec. 29, 2015

(51) Int. Cl.
  *B62D 6/02* (2006.01)
  *B62D 6/00* (2006.01)
(52) U.S. Cl.
  CPC .................. *B62D 6/003* (2013.01); *B62D 6/02* (2013.01)
(58) Field of Classification Search
  CPC ............ B62D 6/003; B62D 6/02; G06F 19/00
  See application file for complete search history.

(56) References Cited

U.S. PATENT DOCUMENTS

| | | | | |
|---|---|---|---|---|
| 2006/0167600 | A1* | 7/2006 | Nelson, Jr. ........... | A01B 69/008 701/23 |
| 2015/0066240 | A1* | 3/2015 | Das Adhikary ........ | G01C 21/12 701/1 |

* cited by examiner

*Primary Examiner* — Richard Camby
(74) *Attorney, Agent, or Firm* — patenttm.us

(57) ABSTRACT

A method for vehicle path tracking with error correction comprises steps of: acquiring vehicle instant information and a target path; developing a predictive path in accordance with the vehicle instant information; determining a vehicle yaw rate threshold value in accordance with the vehicle instant information; calculating a steering angle corresponding to the vehicle yaw rate threshold value; estimating a lateral error correction value corresponding to the steering angle; determining whether the lateral error correction value is not greater than an error value between the target path and the predictive path; controlling a vehicle to turn the steering angle corresponding to the lateral error correction value when the lateral error correction value is less than the error value; and controlling the vehicle to turn the steering angle corresponding to the error value when the lateral error correction value is greater than the error value.

14 Claims, 6 Drawing Sheets

METHOD AND APPARATUS FOR VEHICLE PATH TRACKING WITH ERROR CORRECTION

BACKGROUND OF THE INVENTION

1. Field of the Invention

The present invention relates to a method and apparatus for vehicle path tracking and more particularly relates to a method and apparatus for vehicle path tracking with error correction.

2. Description of Related Art

Advanced-Driver Assistance System (ADAS) is a significant foundation of autonomous vehicles. For example, obstacle detection, assistant driving determination, and communication between vehicles or within the vehicle are significant sub-systems in the ADAS. Many different sensors are used to gather information within the vehicle itself, traffic information, and so on. An electronic controlling unit is used to analyze the information to generate corresponding signals.

With reference to FIG. 9, a conventional control flow diagram for vehicle path tracking is disclosed. As shown in FIG. 9, a controller 100 in the ADAS may obtain a real vehicle driving path in accordance with a known target path 200 and a feedback. The controller 100 compares the target path 200 with the real driving path to obtain an error between the target path 200 and the real driving path, and calculates a turning angle according to the error so as to control the vehicle to adjust a moving path appropriately by the turning angle. The goal to perform the aforementioned adjustment is to keep the vehicle following the target path 200 to move.

With reference to FIG. 10, when the vehicle automatically adjusts its driving path in accordance with the conventional control flow diagram in FIG. 9, a moving path in a first correction path 310 or a second correction path 320 may happen in reality. In one condition, the first correction path 310 represents that the vehicle is obviously away from the target path 200 when the vehicle changes the path during the correction procedure and the correction procedure is too late. In another condition, the second correction path 320 represents that the vehicle changes the path too much during the correction procedure and the vehicle has to perform the correction procedure one more time to move back to the target path 200.

The reason of the occurrence of the problems shown as the first correction path 310 or the second correction path 320 in FIG. 10 is that the controller 100 only compares the error between the target path 200 and the real path without considering dynamic variation of the vehicle during the correction procedure. When the moving path of the vehicle is as shown in the first correction path 310 or the second correction path 320, the movement of the vehicle occurs obviously and frequently in a short time. The passengers in the car may feel uncomfortable and the risk of the rollover of the vehicle may happen.

SUMMARY OF THE INVENTION

An objective of the present invention is to provide a method for vehicle path tracking with error correction to stabilize vehicle steering and avoid accidents such as vehicle rollover.

In order to achieve the aforementioned objective, the method in the present invention comprises steps of:

acquiring vehicle instant information and a target path;

developing a predictive path in accordance with the vehicle instant information;

determining a vehicle yaw rate threshold value in accordance with the vehicle instant information;

calculating a steering angle corresponding to the vehicle yaw rate threshold value;

estimating a lateral error correction value corresponding to the steering angle;

determining whether the lateral error correction value is not greater than an error value between the target path and the predictive path;

controlling a vehicle to turn the steering angle corresponding to the lateral error correction value when the lateral error correction value is not greater than the error value between the target path and the predictive path; and controlling the vehicle to turn the steering angle corresponding to the error value when the lateral error correction value is greater than the error value between the target path and the predictive path.

Another objective of the present invention is to provide an apparatus for vehicle path tracking with error correction to let the passengers in the car feel comfortable and reduce the opportunity of the rollover of the vehicle.

In order to achieve the aforementioned objective, an apparatus for vehicle path tracking with error correction comprises:

a plurality of sensors configured to detect a plurality of different pieces of vehicle instant information;

a path predictive unit configured to develop a predictive path in accordance with the vehicle instant information;

a path correction unit configured to calculate a lateral error correction value in accordance with the vehicle instant information, determine whether the lateral error correction value is greater than an error value, wherein the error value is an error between a target path and a predictive path; when the lateral error correction value is not greater than the error value, the path correction unit outputs a steering angle corresponding to the lateral error correction value; when the lateral error correction value is greater than the error value, the path correction unit outputs the steering angle corresponding to the error value; and when the path correction unit calculates the lateral error correction value, a vehicle yaw rate threshold value is determined in accordance with the vehicle instant information, the steering angle corresponding to the vehicle yaw rate threshold value is calculated and the lateral error correction value is calculated in accordance with the steering angle.

The present invention implements the error value between the predictive path and the target path to be a rational error correction threshold value and estimate the error correction value in accordance with the vehicle instant information. The steering angle of the vehicle can be controlled in accordance with the error correction value when the error value is not greater than the correction threshold value, and accidents due to the excessive steering angle of the vehicle can be avoided and the vehicle can track the target path to drive smoothly in any different traffic situations.

DETAILED DESCRIPTION OF THE PREFERRED EMBODIMENT

These and other aspects of the embodiments herein will be better appreciated and understood when considered in conjunction with the following description and the accompanying drawings.

Figure 1:
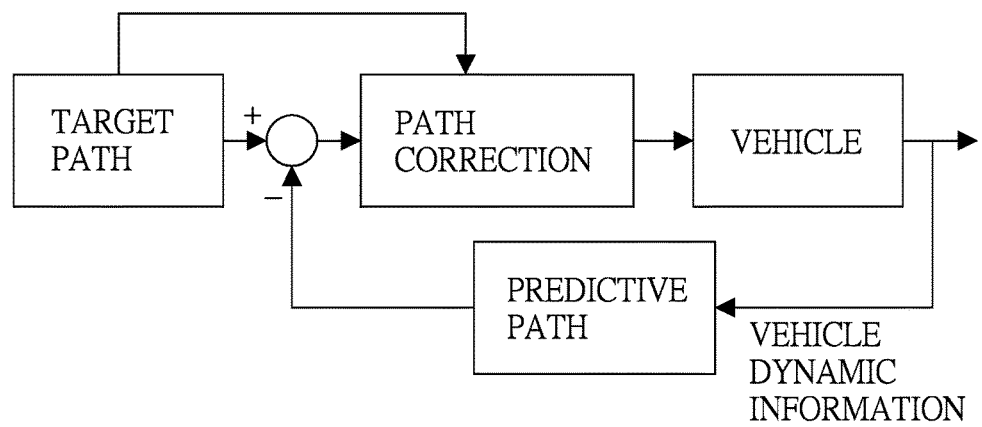
FIG. 1 is a control flow diagram in the present invention.
Figure 2:
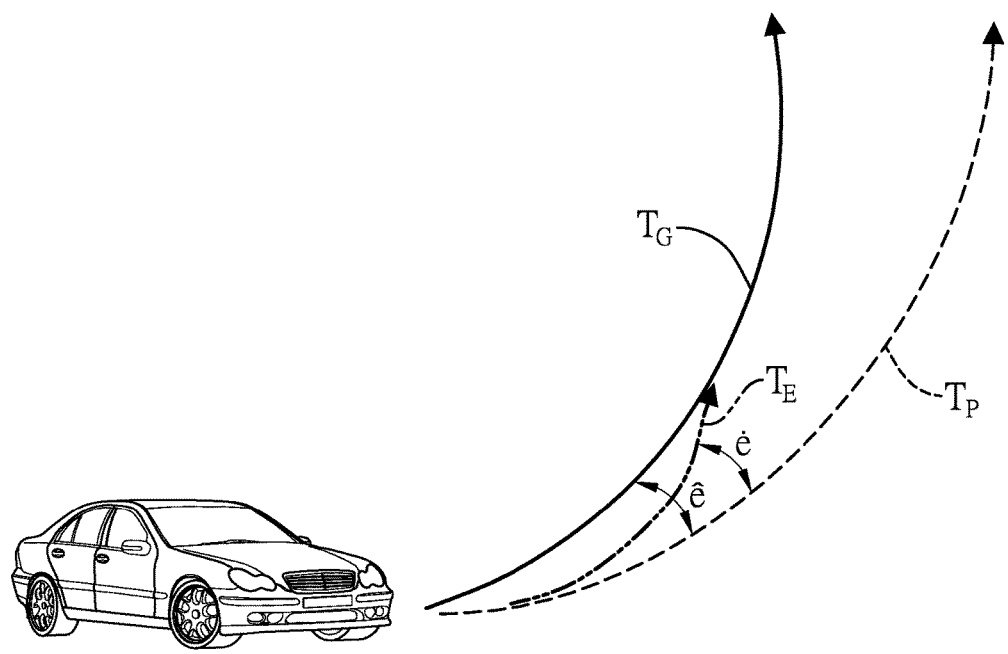
FIG. 2 is a schematic diagram of a vehicle path tracking in the present invention.

With reference to FIG. 1 and FIG. 2, the present invention establishes a predictive path $T_P$ in accordance with vehicle instant information, compares the predictive path $T_P$ with a target path $T_G$, which is available, to obtain an error value ê, and calculate a lateral error correction value ė in accordance with the vehicle instant information to determine and use a steering angle corresponding to the error value ê or the lateral error correction value ė to change a moving path of the vehicle.

With reference to FIG. 2, the target path $T_G$ is represented by a solid line and can be established by the prior art, so the description of the target path $T_G$ is omitted herein. A predictive path $T_P$ is established in the present invention and the description of the predictive path $T_P$ is further specifically cited as follows. The lateral error correction value ė calculated in accordance with the vehicle instant information in the present invention corresponds to a scheduled path $T_E$. When the vehicle is controlled to proceed, the moving path of the vehicle is performed along the predictive path $T_P$ or the scheduled path $T_E$ in accordance with the calculation result. The actual moving path of the vehicle is maintained as consistent as possible with the target path $T_G$. The detailed technique of the method in the present invention is described as follows.

Figure 3:
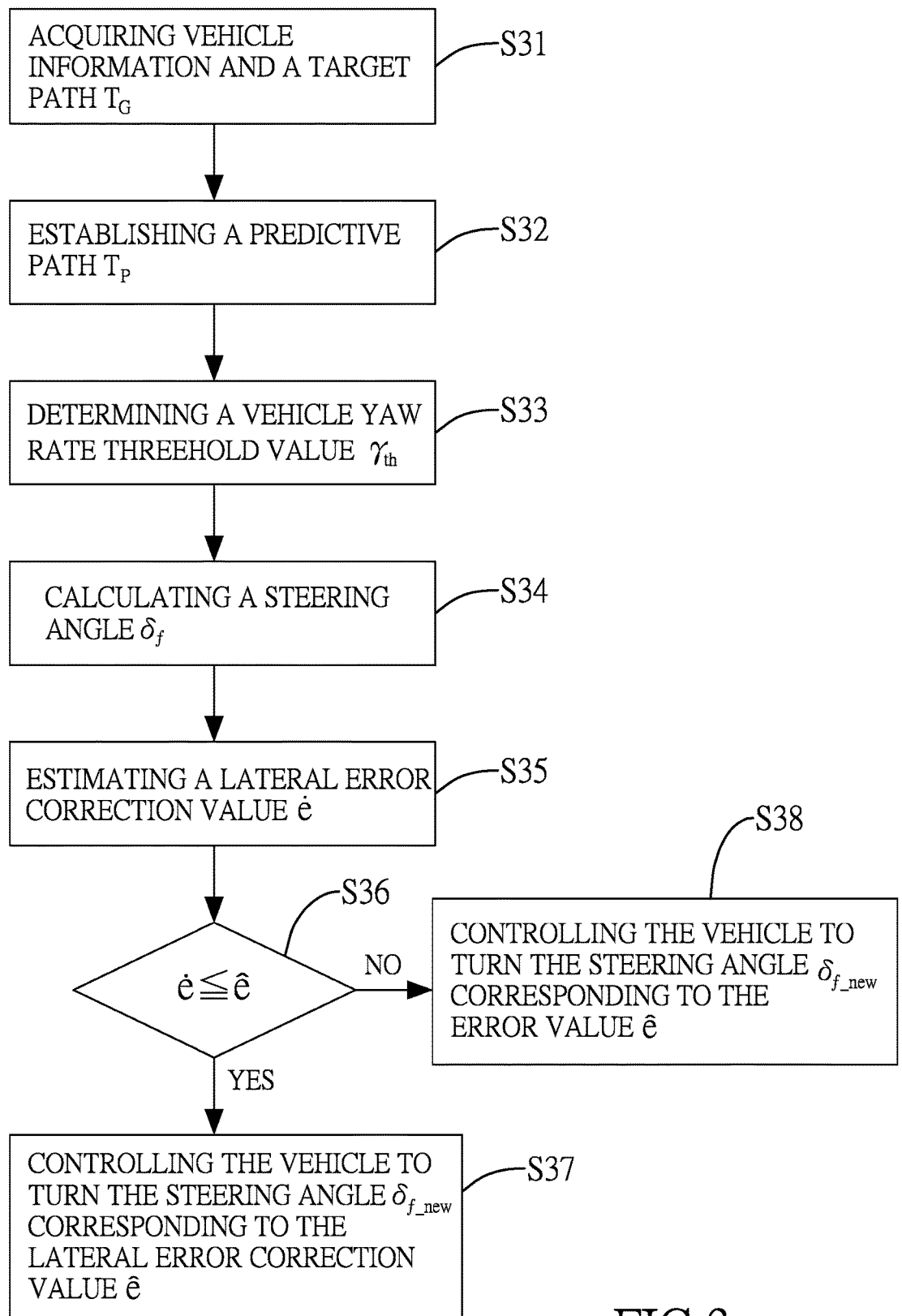
FIG. 3 is a flow chart of the method for vehicle path tracking with error correction in the present invention.

With reference to FIG. 3, the method in the present invention includes the following steps:

Step S31 is to acquire vehicle instant information and a target path $T_G$. The vehicle instant information includes a vehicle speed, a lateral accelerating speed, a driver vehicle model, a driving scenario, and so on, but it is not limited herein.

Figure 4:
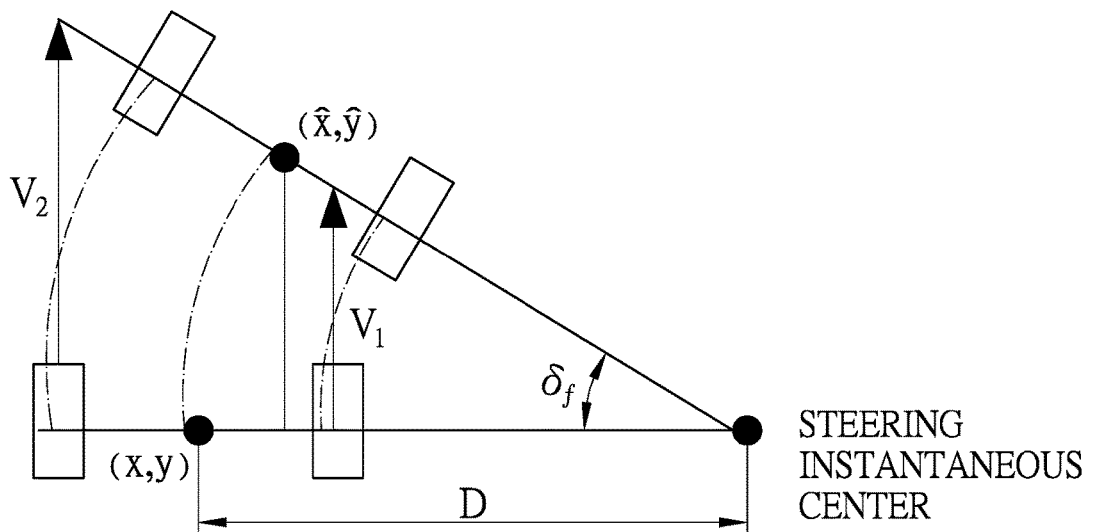
FIG. 4 is a schematic diagram showing an estimation of a predictive path in the present invention.

Step S32 is to establish a predictive path $T_P$. The predictive path $T_P$ is calculated in accordance with the vehicle instant information. A model shown in FIG. 4 is an example in the present embodiment. A current position of a wheel center of a front wheel (illustrated as a rectangular pattern) of the vehicle may be represented as (x, y). A predictive position in a next time of the wheel center of the front wheel may be represented as (x̂, ŷ), where x̂=D–D cos $\delta_f$, ŷ=D sin $\delta_f$, D is a length from the wheel center (x, y) to a steering instantaneous center, and $\delta_f$ is a front wheel steering angle. Therefore, based on a historical path of the vehicle established from a previous position to a current position, multiple predictive positions (x̂, ŷ) at different times may be continually estimated to develop a predictive path $T_P$. If the predictive path $T_P$ is different from the target path $T_G$, an error value ê between the target path $T_G$ and the predictive path $T_P$ exists.

Step S33 is to determine a vehicle yaw rate threshold value $\gamma_{th}$. The vehicle yaw rate threshold value $\gamma_{th}$ corresponding to the current vehicle instant information is determined by searching a table in accordance with the vehicle instant information. Since the vehicle yaw rate threshold value is determined by searching the table, the vehicle model configuration simulation program can be implemented to develop a pre-established lookup table in advance. The lookup table records the vehicle yaw rate threshold values $\gamma_{th}$ when the vehicle is in different situations. In the present embodiment, the lookup table records the vehicle yaw rate threshold values $\gamma_{th}$ corresponding to different speeds. The vehicle yaw rate threshold value $\gamma_{th}$ corresponding to the instant speed can be determined by searching the lookup table in accordance with the instant speed.

Figure 5:
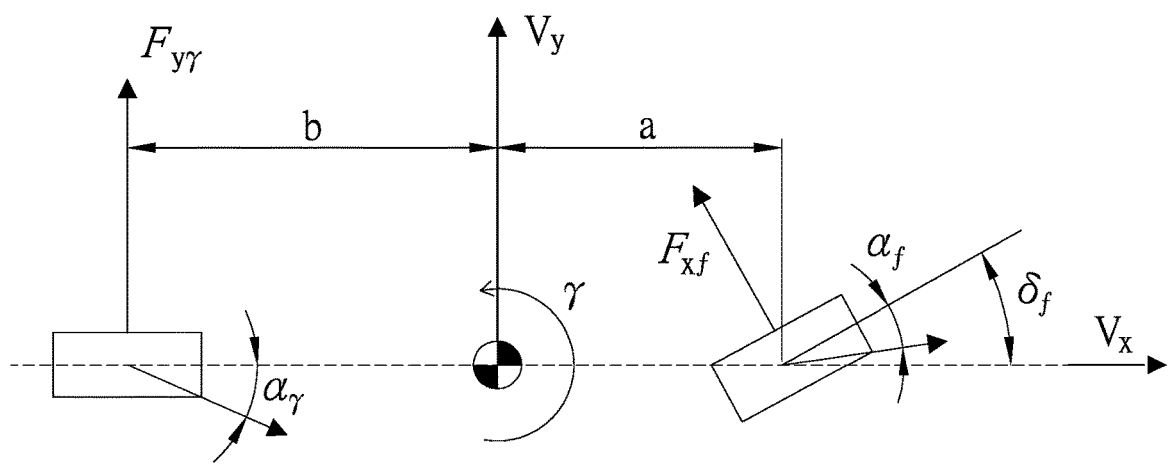
FIG. 5 is a schematic diagram of calculating a steering angle by implementing a bicycle model in the present invention.

Step S34 is to calculate a steering angle $\delta_f$. The corresponding steering angle $\delta_f$ can be calculated by the vehicle yaw rate threshold value $\gamma_{th}$, which is searched from the lookup table. The present embodiment implements a bicycle model shown in FIG. 5 to calculate the steering angle $\delta_f$ by the following equation:

$$\delta_f = \dot{\psi}\frac{L\left(1+\frac{v_x^2}{v_{ch}^2}\right)}{v_x}$$

where $\dot{\psi}$ is yaw rate, L is vehicle length, $v_x$ longitudinal vehicle speed, and $\delta_f$ is the steering angle.

Step S35 is to estimate a lateral error correction value ė. When the steering angle $\delta_f$ is calculated, the lateral error correction value ė can be calculated in accordance with the steering angle and the instant speed of the vehicle. The lateral error correction value can be calculated by using a vehicle lateral moving status space equation shown as follows:

$$\begin{bmatrix} \dot{y} \\ \dot{v}_y \\ \dot{\psi} \\ \dot{r} \end{bmatrix} = \begin{bmatrix} 0 & 1 & v_x & 0 \\ 0 & \frac{-(C_{af}+C_{ar})}{mv_x} & 0 & \frac{bC_{ar}-bC_{af}}{mv_x}-v_x \\ 0 & 0 & 0 & 1 \\ 0 & \frac{bC_{ar}-bC_{af}}{I_z v_x} & 0 & \frac{-(a^2 C_{af}+b^2 C_{ar})}{I_z v_x} \end{bmatrix} \begin{bmatrix} y \\ v_y \\ \psi \\ r \end{bmatrix} + \begin{bmatrix} 0 \\ \frac{C_{\varepsilon f}}{m} \\ 0 \\ \frac{aC_{af}}{I_z} \end{bmatrix} \delta_f$$

and those parameters in the equation are:
$v_{ch}$: vehicle speed
$v_x$: longitudinal vehicle speed,
$v_y$: lateral vehicle speed
$C_{af}$: front wheel steering stiffness
$C_{ar}$: rear wheel steering stiffness
L: vehicle length
m: vehicle weight
a: length from front axis to centre of gravity
b: length from rear axis to centre of gravity
Iz: movement of inertia
y: vehicle lateral displacement
$\psi$: yaw angle
r: yaw rate ($\dot{\psi}$)
$\delta_f$: front wheel steering angle
ẏ: lateral error correction value.

Step S36 is to determine if the lateral error correction value ė is greater than an error value ê between the target path and the predictive path.

Figure 6:
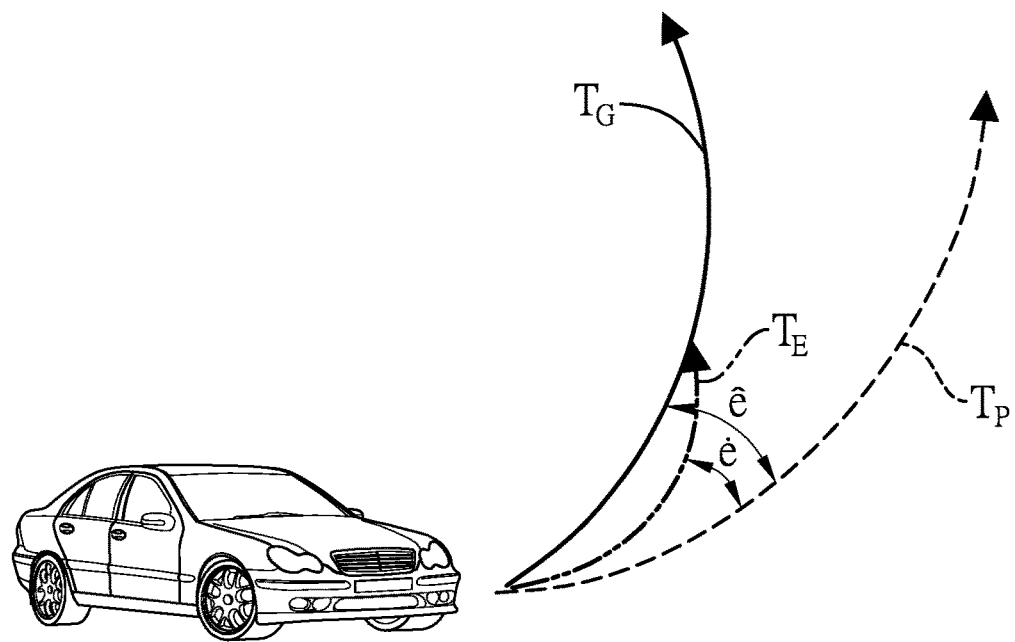
FIG. 6 is a schematic diagram showing that a movement of a vehicle is controlled by an error correction value in the present invention.

Step S37 is to control the vehicle to turn the steering angle $\delta_f$ corresponding to the lateral error correction value ė when the lateral error correction value ė is not greater than the error value ê between the target path and the predictive path. As shown in FIG. 6, when the error value ê between the target path and the predictive path is greater than the calculated lateral error correction value ė, the steering angle $\delta_f$ corresponding to the lateral error correction value ė is used to control the vehicle and the vehicle is moved along the scheduled path and close to the target path.

Figure 7:
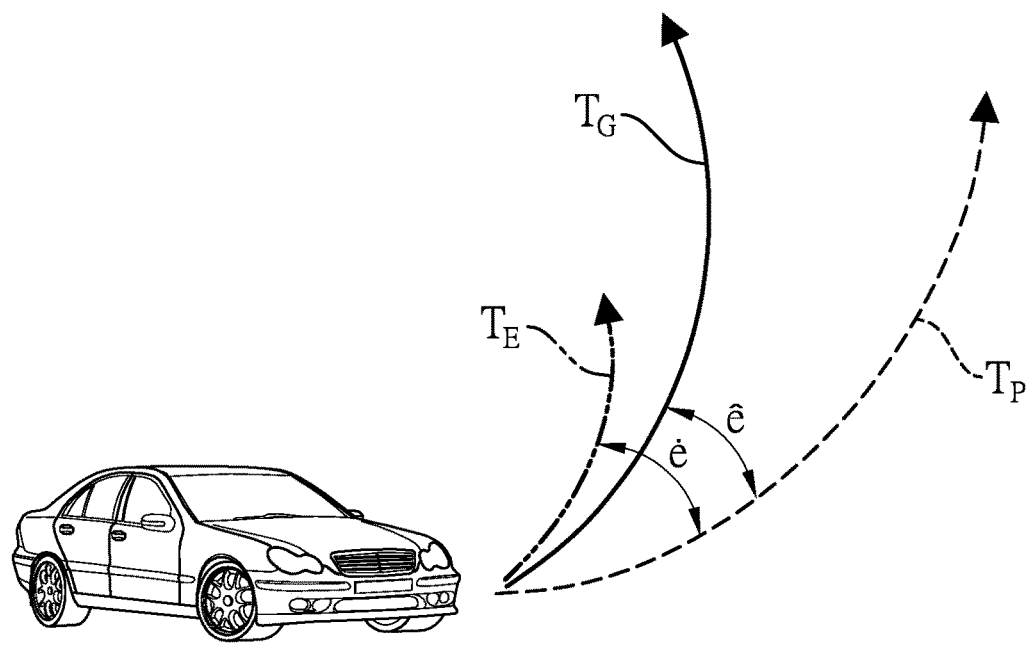
FIG. 7 is a schematic diagram showing that the error value between the target path and the predictive path is used to control the movement of the vehicle.

Step S38 is to control the vehicle to turn the steering angle $\delta_{f\_new}$ corresponding to the error value ê when the lateral error correction value is greater than the error value ê between the target path and the predictive path. As shown in FIG. 7, when the calculated lateral error correction value ė is greater than the error value ê and it is assumed that the vehicle is still moved along the scheduled path in accordance with the steering angle corresponding to the lateral error correction value ė. It is obvious to see that the vehicle will over-deviate from the target path $T_G$ and the vehicle is required to correct the movement back to the target path $T_G$. Therefore, the steering angle $\delta_f$ will not be adopted. Conversely, in this condition, the steering angle $\delta_{f\_new}$ corresponding to the error value ê between the target path and the predictive path is calculated and the vehicle is moved in accordance with the steering angle $\delta_{f\_new}$.

Figure 8:
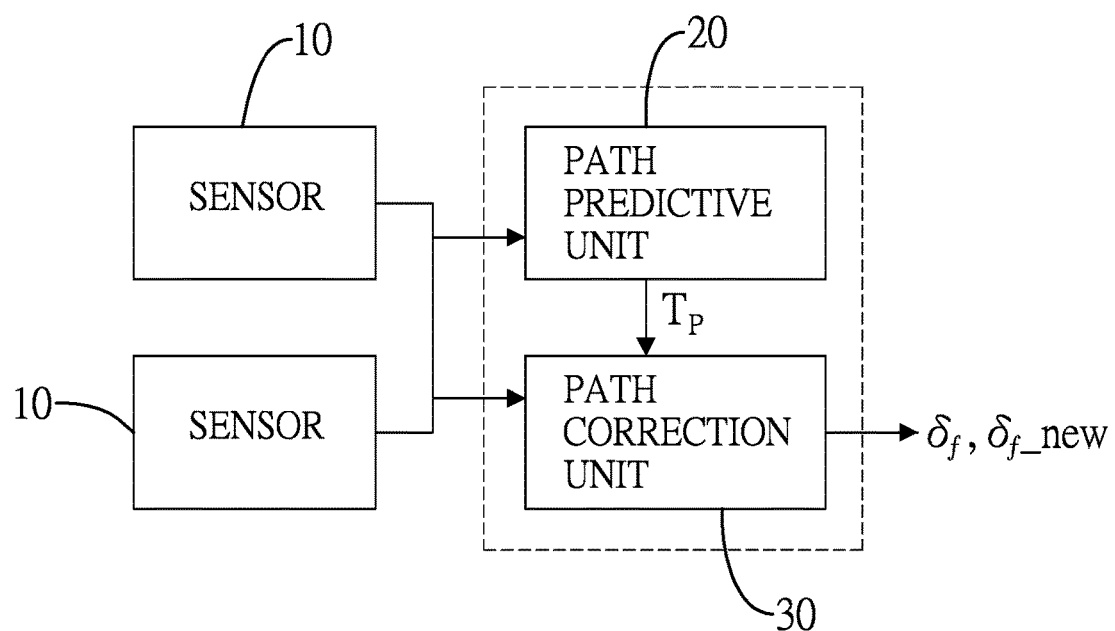
FIG. 8 is a block diagram of an apparatus in the present invention.
Figure 9:
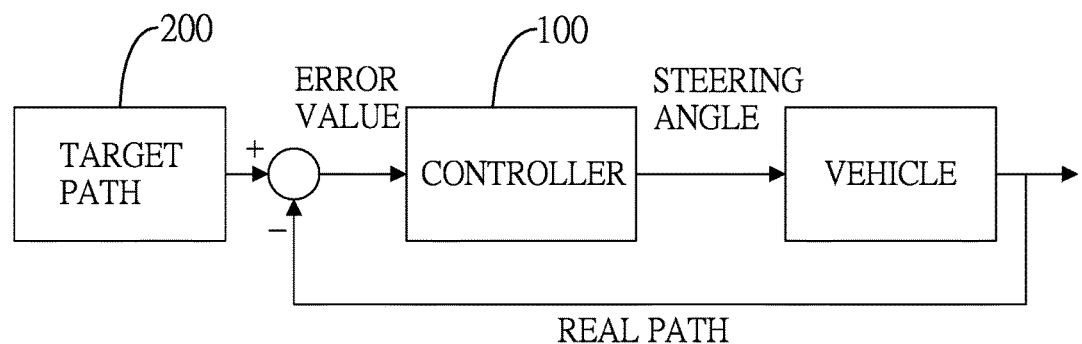
FIG. 9 is a control flow diagram of a conventional vehicle path tracking.
Figure 10:
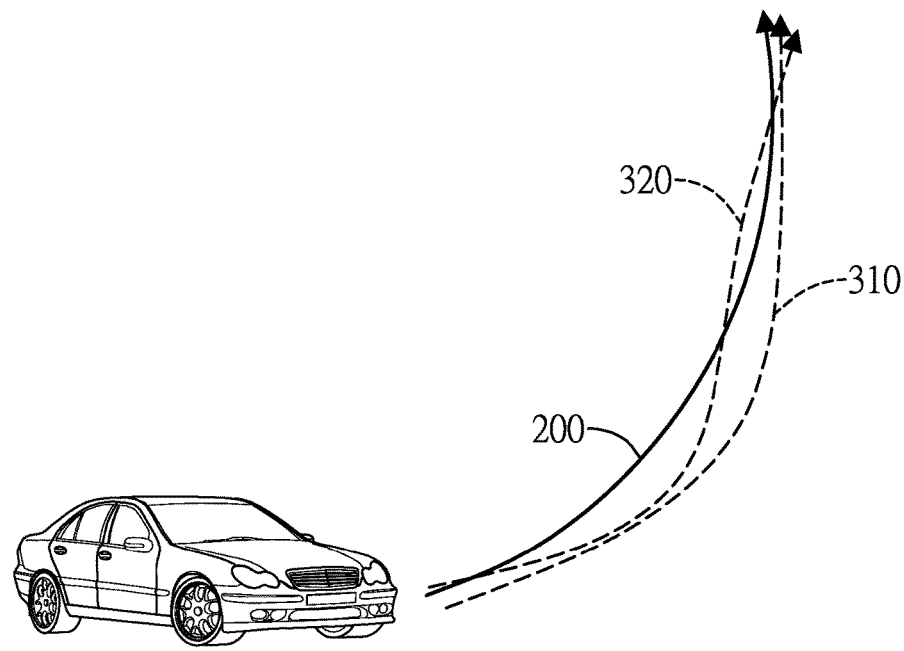
FIG. 10 is a schematic diagram of a path of the conventional vehicle path tracking.

With reference to FIG. 8, FIG. 8 is a block diagram of an apparatus for vehicle path tracking with error correction in the present invention. The apparatus is installed within the vehicle and is performed in accordance with the method shown in FIG. 3. The apparatus includes:

a plurality of sensors 10, which is configured to detect a plurality of different pieces of vehicle instant information, wherein the sensors 10 can include a vehicle speed sensor, an accelerating sensor, a camera lens, a global position service (GPS) device, an inertial measurement unit (IMU) or any combination thereof;

a path predictive unit 20, which is configured to develop a predictive path $T_P$ in accordance with the vehicle instant information;

a path correction unit 30, which is configured to calculate a lateral error correction value ė in accordance with the vehicle instant information, determine if the lateral error correction value ė is greater than the error value ê, and when the lateral error correction value ė is not greater than the error value ê, a steering angle $\delta_f$ corresponding to the lateral error correction value ė is outputted; when the lateral error correction value ė is greater than the error value, the steering angle $\delta_{f\_new}$ corresponding to the error value is outputted.

The path correction unit 30 can perform those specific procedures in steps S33-S38, so the description for the path correction unit 30 is omitted herein. The path predictive unit 20 and the path correction unit 30 can be integrated together to be one single unit or performed by one single micro processor.

In summary, the present invention can develop a predictive path $T_P$ in accordance with the instant information of the vehicle and the predictive path $T_P$ is compared with the target path $T_G$, which is available, to obtain the error value ê. The error value ê represents a maximum tolerance value of the steering angle for the vehicle. When the steering angle of the vehicle is not greater than the maximum tolerance value, the vehicle is able to drive smoothly and the passengers feel comfortable. The present invention implements the vehicle instant information to estimate the error correction value. When the steering angle of the vehicle is not greater than the maximum value, the vehicle is controlled in accordance with the error correction value and the moving path of the vehicle is approaching close to the target path.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A method for vehicle path tracking with error correction, the method comprising steps of:
   acquiring vehicle instant information and a target path;
   developing a predictive path in accordance with the vehicle instant information;
   determining a vehicle yaw rate threshold value in accordance with the vehicle instant information;
   calculating a steering angle corresponding to the vehicle yaw rate threshold value;
   estimating a lateral error correction value corresponding to the steering angle;
   determining whether the lateral error correction value is not greater than an error value between the target path and the predictive path;
   controlling a vehicle to turn the steering angle corresponding to the lateral error correction value when the lateral error correction value is not greater than the error value between the target path and the predictive path; and
   controlling the vehicle to turn the steering angle corresponding to the error value when the lateral error correction value is greater than the error value between the target path and the predictive path.

2. The method as claimed in claim 1, wherein in the step of determining the vehicle yaw rate threshold value, the vehicle yaw rate threshold value is determined in a pre-established lookup table in accordance with the vehicle instant information.

3. The method as claimed in claim 2, wherein the pre-established lookup table records a plurality of vehicle yaw rate threshold values respectively corresponding to different vehicle speeds, and the yaw rate threshold value can be found in the look-up table by an instant vehicle speed.

4. The method as claimed in claim 1, wherein the step of calculating the steering angle corresponding to the vehicle yaw rate threshold value is to calculate the steering angle in accordance with an equation of:

$$\delta_f = \dot{\psi} \frac{L\left(1 + \frac{v_x^2}{v_{ch}^2}\right)}{v_x}$$

wherein $\dot{\psi}$ is a yaw rate, L is a vehicle length, $v_x$ a longitudinal vehicle speed, and $\delta_f$ is the steering angle.

5. The method as claimed in claim 2, wherein the step of calculating the steering angle corresponding to the vehicle yaw rate threshold value is to calculate the steering angle in accordance with an equation of:

$$\delta_f = \dot{\psi} \frac{L\left(1 + \frac{v_x^2}{v_{ch}^2}\right)}{v_x}$$

wherein $\dot{\psi}$ is a yaw rate, L is a vehicle length, $v_x$ a longitudinal vehicle speed, and $\delta_f$ is the steering angle.

6. The method as claimed in claim 3, wherein the step of calculating the steering angle corresponding to the vehicle yaw rate threshold value is to calculate the steering angle in accordance with an equation of:

$$\delta_f = \dot{\psi} \frac{L\left(1 + \frac{v_x^2}{v_{ch}^2}\right)}{v_x}$$

wherein $\dot{\psi}$ is a yaw rate, L is a vehicle length, $v_x$ is a longitudinal vehicle speed, and $\delta_f$ is the steering angle.

7. The method as claimed in claim 4, wherein the step of estimating the lateral error correction value corresponding to the steering angle is to estimate the lateral error correction value in accordance with an equation of:

$$\begin{bmatrix} \dot{y} \\ \dot{v}_y \\ \dot{\psi} \\ \dot{r} \end{bmatrix} = \begin{bmatrix} 0 & 1 & v_x & 0 \\ 0 & \frac{-(C_{af}+C_{ar})}{mv_x} & 0 & \frac{bC_{ar}-bC_{af}}{mv_x} - v_x \\ 0 & 0 & 0 & 1 \\ 0 & \frac{bC_{ar}-bC_{af}}{I_z v_x} & 0 & \frac{-(a^2 C_{af}+b^2 C_{ar})}{I_z v_x} \end{bmatrix} \begin{bmatrix} y \\ v_y \\ \psi \\ r \end{bmatrix} + \begin{bmatrix} 0 \\ \frac{C_{\varepsilon f}}{m} \\ 0 \\ \frac{aC_{af}}{I_z} \end{bmatrix} \delta_f$$

wherein
$v_{ch}$: vehicle speed,
$v_x$: longitudinal vehicle speed,
$v_y$: lateral vehicle speed,
$C_{af}$: front wheel steering stiffness,
$C_{ar}$: rear wheel steering stiffness,
L: vehicle length,
m: vehicle weight,
a: length from front axis to centre of gravity,
b: length from rear axis to centre of gravity,
Iz movement of inertia,
y: vehicle lateral displacement,
ψ: yaw angle,
r: yaw rate ($\dot{\psi}$),
$\delta_f$: front wheel steering angle, and
ẏ: lateral error correction value.

8. The method as claimed in claim 5, wherein the step of estimating the lateral error correction value corresponding to the steering angle is to estimate the lateral error correction value in accordance with an equation of:

$$\begin{bmatrix} \dot{y} \\ \dot{v}_y \\ \dot{\psi} \\ \dot{r} \end{bmatrix} = \begin{bmatrix} 0 & 1 & v_x & 0 \\ 0 & \frac{-(C_{af}+C_{ar})}{mv_x} & 0 & \frac{bC_{ar}-bC_{af}}{mv_x} - v_x \\ 0 & 0 & 0 & 1 \\ 0 & \frac{bC_{ar}-bC_{af}}{I_z v_x} & 0 & \frac{-(a^2 C_{af}+b^2 C_{ar})}{I_z v_x} \end{bmatrix} \begin{bmatrix} y \\ v_y \\ \psi \\ r \end{bmatrix} + \begin{bmatrix} 0 \\ \frac{C_{\varepsilon f}}{m} \\ 0 \\ \frac{aC_{af}}{I_z} \end{bmatrix} \delta_f$$

wherein
$v_{ch}$: vehicle speed,
$v_x$: longitudinal vehicle speed,
$v_y$: lateral vehicle speed,
$C_{af}$: front wheel steering stiffness,
$C_{ar}$: rear wheel steering stiffness,
L: vehicle length,
m: vehicle weight,
a: length from front axis to centre of gravity,
b: length from rear axis to centre of gravity,
Iz: movement of inertia,
y: vehicle lateral displacement,
ψ: yaw angle,
r: yaw rate ($\dot{\psi}$),
$\delta_f$: front wheel steering angle, and
ẏ: lateral error correction value.

9. The method as claimed in claim 6, wherein the step of estimating the lateral error correction value corresponding to the steering angle is to estimate the lateral error correction value in accordance with an equation of:

$$\begin{bmatrix} \dot{y} \\ \dot{v}_y \\ \dot{\psi} \\ \dot{r} \end{bmatrix} = \begin{bmatrix} 0 & 1 & v_x & 0 \\ 0 & \frac{-(C_{af}+C_{ar})}{mv_x} & 0 & \frac{bC_{ar}-bC_{af}}{mv_x} - v_x \\ 0 & 0 & 0 & 1 \\ 0 & \frac{bC_{ar}-bC_{af}}{I_z v_x} & 0 & \frac{-(a^2 C_{af}+b^2 C_{ar})}{I_z v_x} \end{bmatrix} \begin{bmatrix} y \\ v_y \\ \psi \\ r \end{bmatrix} + \begin{bmatrix} 0 \\ \frac{C_{\varepsilon f}}{m} \\ 0 \\ \frac{aC_{af}}{I_z} \end{bmatrix} \delta_f$$

wherein
$v_{ch}$: vehicle speed,
$v_x$: longitudinal vehicle speed,
$v_y$: lateral vehicle speed,
$C_{af}$: front wheel steering stiffness,
$C_{ar}$: rear wheel steering stiffness,
L: vehicle length,
m: vehicle weight,
a: length from front axis to centre of gravity,
b: length from rear axis to centre of gravity,
Iz: movement of inertia,
y: vehicle lateral displacement,
ψ: yaw angle,
r: yaw rate ($\dot{\psi}$),
$\delta_f$: front wheel steering angle, and
ẏ: lateral error correction value.

10. The method as claimed in claim 7, wherein in the step of establishing the predictive path, a vehicle current position is represented as (x, y), a predictive position at next time is represented as ($\hat{x}$, $\hat{y}$) where $\hat{x}$=D−D cos $\delta_f$, $\hat{y}$=D sin $\delta_f$ and D represents a length from a wheel center (x, y) to a steering instantaneous enter, and $\delta_f$ represents a front wheel steering angle.

11. An apparatus for vehicle path tracking with error correction, comprising:
   a plurality of sensors configured to detect a plurality of different pieces of vehicle instant information;
   a path predictive unit configured to develop a predictive path in accordance with the vehicle instant information;
   a path correction unit configured to calculate a lateral error correction value in accordance with the vehicle instant information, determine whether the lateral error correction value is greater than an error value, wherein the error value is an error between a target path and a predictive path; when the lateral error correction value is not greater than the error value, the path correction unit outputs a steering angle corresponding to the lateral error correction value; when the lateral error correction value is greater than the error value, the path correction unit outputs the steering angle corresponding to the error value; and when the path correction unit calculates the lateral error correction value, a vehicle yaw rate threshold value is determined in accordance with the vehicle instant information, the steering angle corresponding to the vehicle yaw rate threshold value is calculated and the lateral error correction value is calculated in accordance with the steering angle.

12. The apparatus as claimed in claim 11, wherein the sensors include a vehicle speed sensor, an accelerating sensor, a camera lens, a global position service device, an inertial measurement unit or any combination thereof.

13. The apparatus as claimed in claim 11, wherein the path predictive unit and the path correction unit are integrated as a micro processor.

14. The apparatus as claimed in claim 11, wherein the vehicle instant information includes a vehicle speed, a lateral speed, a driver vehicle model, a driving scenario or any combination thereof.

* * * * *